United States Patent Office 3,394,332
Patented July 23, 1968

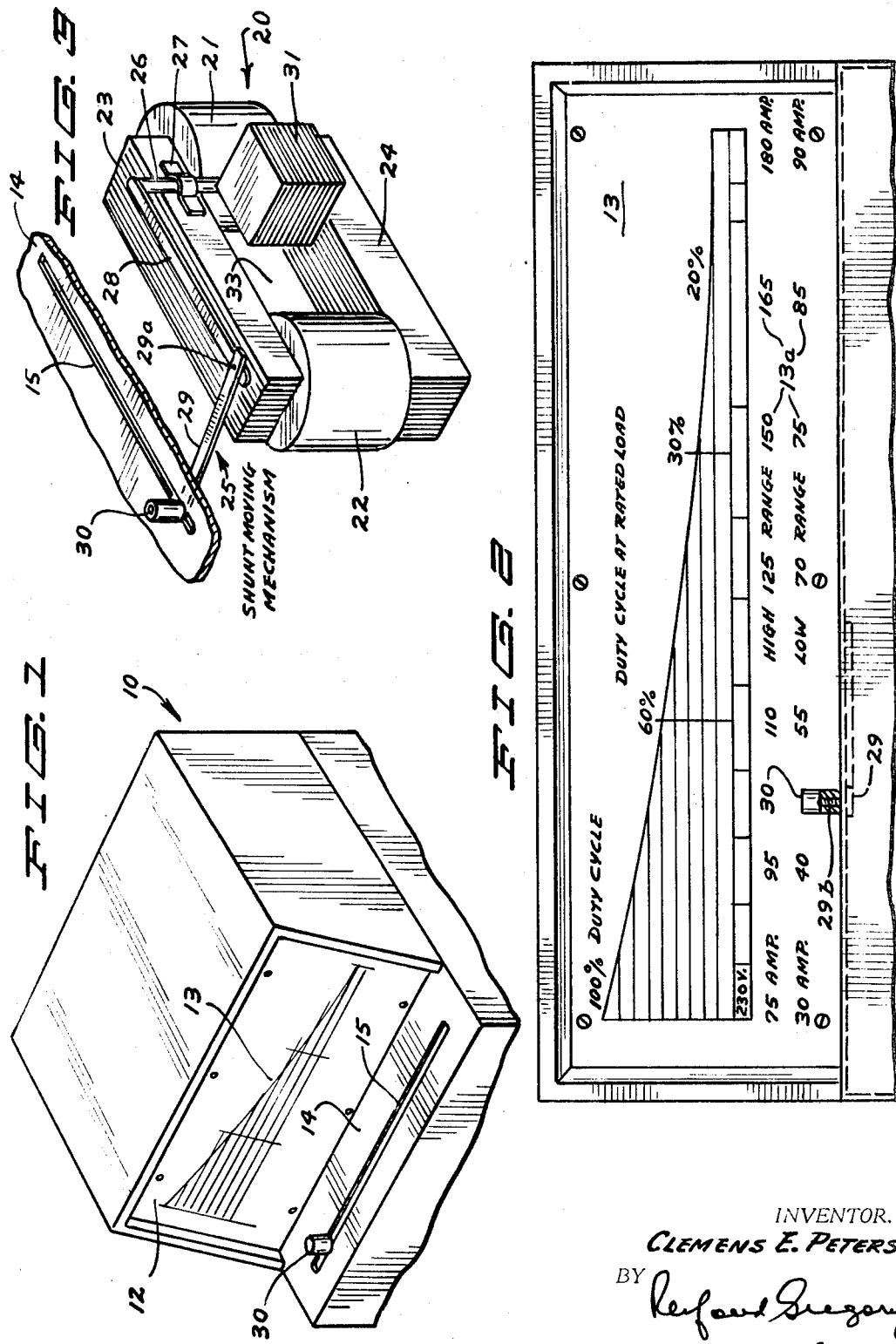

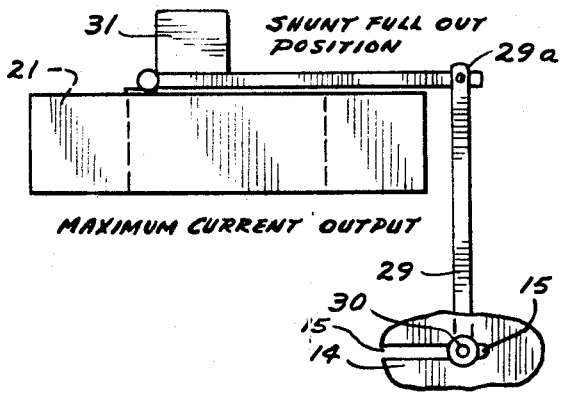
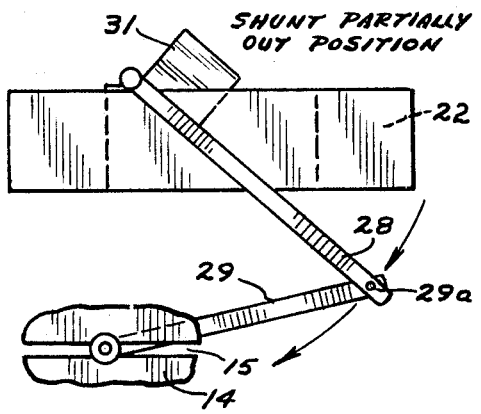
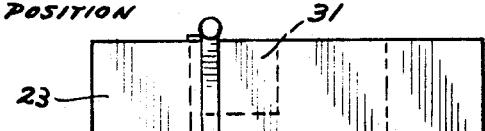
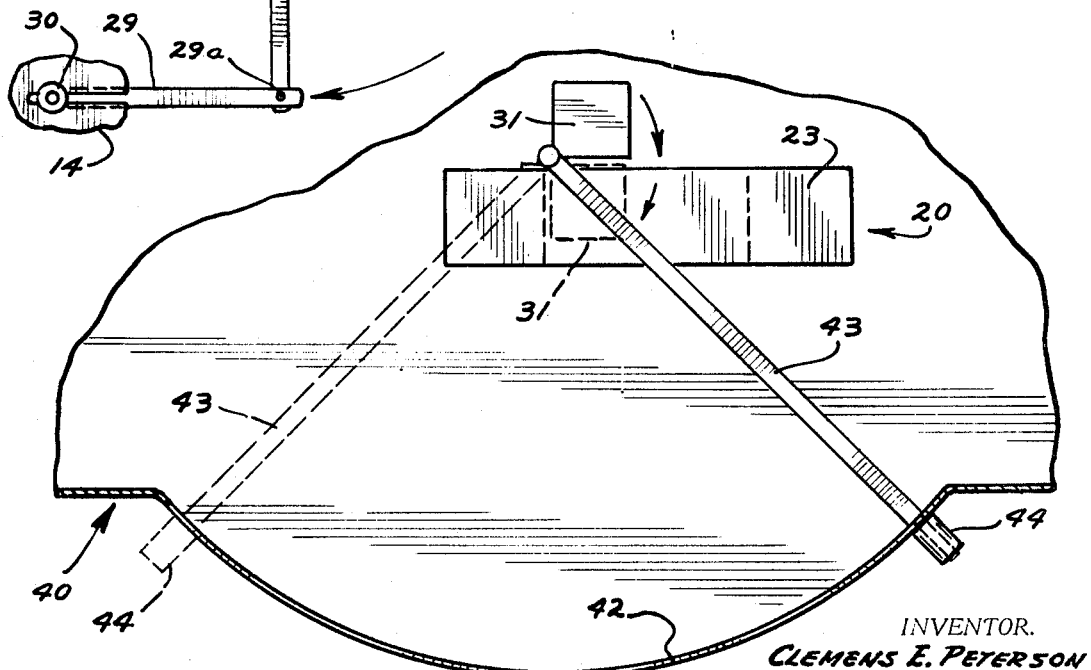

3,394,332
VARIABLE SHUNT CONTROL MECHANISM
Clemens E. Peterson, Minneapolis, Minn., assignor to Twentieth Century Manufacturing Company, Minneapolis, Minn., a corporation of Minnesota
Filed Aug. 4, 1965, Ser. No. 477,104
4 Claims. (Cl. 336—130)

ABSTRACT OF THE DISCLOSURE

A control mechanism in connection with the transformer of a welding apparatus for stepless regulation of the shunt mechanism consisting of a shunt, an upright hinge pin swingably carrying said shunt to move the same fully into or out of the air gap between the coils, a pivoted arm rigid with said hinge pin and a knob movable in a slot to operate said arm and said shunt.

The invention herein relates to improvement in the operation and control of means to obtain a continuous regulation of current in connection with an arc welding apparatus.

More specifically, the invention herein relates to control means for a movable shunt mechanism used for controlling the flux interlinking the primary and secondary coils or windings of a welding transformer for variably controlling the flow of welding current in the secondary coil.

It is an object of this invention to provide a simple means for controlling and positioning a movable shunt mechanism with respect to a transformer in connection with an arc welding apparatus.

It is another object of this invention to provide means for directly and quickly varying the position of a movable shunt mechanism and for positively locking the same in a given position.

It is a more specific object of this invention to provide a simple and positive lever control for directly pivoting a shunt member to interrupt the path between the primary and secondary coils to vary and control the flow of welding current in the secondary coil.

It is a further object of this invention to provide an inexpensive simply installed means for carrying out the objects above set forth.

These and other objects and advantages of the invention will be set forth in the following description made in connection with the accompanying drawings in which like reference characters refer to similar parts throughout the several views and in which:

FIG. 1 is a broken view in perspective showing a portion of the housing of the invention herein;

FIG. 2 is a broken view in front elevation on an enlarged scale of a detail of said housing;

FIG. 3 is a perspective view on an enlarged scale illustrating diagrammatically the shunt control mechanism with the transformer and a fragmentary directly related portion of the housing;

FIGS. 4, 5 and 6 show diagrammatically alternate positions of the shunt control mechanism with reference to the transformer; and FIG. 7 is a view in broken horizontal section showing a modification of the invention herein and showing a portion in alternate position in dotted line.

With reference to FIGS. 1–6, a broken portion of a housing 10 is shown comprising an inclined front panel 12 having a plate 13 thereon with said plate bearing self-explanatory indicia 13a having reference to the operation of the apparatus. Extending forwardly of said panel 12 is a horizontal ledge portion 14 having a slot 15 extending thereacross. Only so much of said housing is shown as is necessary for a disclosure of the invention herein and as bears direct relation to the operation of the control mechanism of the invention herein.

It will be understood that the entire apparatus embodying the invention herein comprises an AC arc welding apparatus but only so much of the apparatus is shown as is directly pertinent to the invention disclosed herein.

With regard to FIG. 3, a transformer 20 is shown of conventional design comprising upper and lower yokes 23 and 24 having coils 21 and 22 disposed therebetween and about the legs extending between said yoke members adjacent the respective ends thereof. Said leg members are not shown and their structure is of conventional design. Said coil 21 will be the primary coil and coil 22 will be the secondary coil. Framed by said yokes and said coils is an air gap 33.

Pivoted to one side of the upper yoke 23 by a collar bracket 27 forming a hinge is a vertically disposed rod-like member 26 referred to as a hinge pin. Said bracket support and its operating relationship with said hinge pin is of conventional design.

Integral with said hinge pin and rigid therewith is a horizontal lever arm 28 having a second arm 29 pivoted to the free end thereof by a pin or rivet 29a. Said second arm has at its free end an upstanding threaded finger portion 29b, as indicated in FIG. 2. Said finger portion will extend upwardly through the slot 15 and will have threaded thereonto to override said slot a knob 30 which when threaded down will bear against the adjacent portions of said ledge, pinching and lockingly engaging said ledge between itself and the underlying portion of said arm 29.

Said hinge pin 26 will extend sufficiently above said yoke 23 to provide clearance for movement of said arms 28 and 29 and will extend downwardly sufficiently to carry the shunt member 31. Said shunt member is here shown to be substantially parallelepiped in form and will be secured to said hinge pin in a conventional manner. Said shunt member will be so positioned that with the knob 30 at one end of the slot 15 as shown in FIG. 3, said shunt member will be fully out of the air gap 33, and when said knob is moved to the other end of said slot, said shunt member will be fully within said air gap.

OPERATION

When the shunt member 31 is variably pivoted or swung into the air gap 33, the path, or in other words the lines of force between the primary and secondary coils, is interrupted, and by means of such interruption and of the extent thereof, the flow of welding current in the secondary coil is regulated. There is thus provided a continuous stepless regulation and the amperage present in the secondary coil is thus under complete control of the operator.

The principle of stepless regulation by variable interruption of the path between the primary and secondary coils is not new, but what is claimed as improvement is the simple positive control mechanism for quickly and accurately pivotally positioning said shunt member with respect to the air gap. Conventional means comprise worm gears or rack and gear combinations together with hand wheels for operation of the same, and in known instances cable and pulley arrangements are used.

A quick positive regulation of the position of the shunt member is desirable and it is necessary that there be positive fastening means for holding the shunt member locked in position under operating conditions.

The knob 30 threaded onto the finger 29b provides positive locking of the lever arms 28 and 29. Said knob securely pinches the adjacent portions of said ledge against the underlying portion of arm 29 for a non-slipping locking engagement.

FIGS. 4–6 show the extreme positions and an intermediate position of the shunt member 31 with respect to the air gap 33. The knob and attendant lever arms will be moved to provide the desired welding current in accordance with the indicia 13a on the plate member 13. The operation of the control mechanism is believed to be obvious from the above description.

The indicia 13a indicates two amperage scales. This plate member is adapted for use with a welding apparatus having two taps, but this does not relate to the disclosure of the invention herein and henceforth reference thereto is believed not to be necessary.

MODIFICATION

With reference to FIG. 7, a modification is indicated in which the mechanism for pivoting or swinging the shunt member consists of a single lever arm 43 which will be integral and rigid with said hinge pin member 26 as by welding or by an inter-fitting non-slipping engagement.

The housing 10 is modified to accommodate the single lever arm. The modified housing indicated by the numeral 40 will be identical to said housing 10 with the exception of providing a slotted vertical front panel or front wall 41 in lieu of the inclined front wall 12 above described. Said front wall 41 will be curved in horizontal cross section and will have an elongated slot 42 therein through which will extend a reduced finger portion of said lever arm 43, and said finger portion which is identical to the finger portion 29b will have threaded thereon a knob or handle 44. The plate member 13 bearing the indicia will be mounted on a shelf or ledge portion corresponding to said ledge portion 14. It is believed that further description of the housing is not necessary as the construction of the pertinent portions of the housing appears to be in sufficient detail as given.

The operation of the modified device is the same as the operation of said device first above described.

Thus it is seen that I have provided a relatively inexpensive simply constructed variable shunt mechanism providing a quick positive stepless regulation of a shunt member controlling the character of welding current.

It will of course be understood that various changes may be made in form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. An apparatus of the type indicated having in combination,
    a transformer having a pair of spaced coils having an air gap therebetween, said air gap having one side open and unobstructed,
    an upstanding hinge pin adjacent one of said coils adjacent said unobstructed side opening of said air gap,
    a shunt member secured to said hinge pin for movement fully into and out of said air gap, and
    lever means connected with said shunt member moving the same.

2. The structure set forth in claim 1, including
    a housing having said transformer embodied therein, said housing having a slot in a wall portion thereof,
    said lever means having a portion thereof extending through said slot, and
    means carried on said extended portion of said lever to secure the same to said housing at various points thereon to the extent of said slot.

3. The structure set forth in claim 1, wherein
    said shunt member is substantially parallelepiped in form, and
    means secure one corner portion of said shunt member to said hinge pin.

4. The structure set forth in claim 1, wherein
    said lever means comprises an arm rigid with said hinge pin.

References Cited

UNITED STATES PATENTS

| | | | |
|---|---|---|---|
| 2,299,329 | 10/1942 | Landis | 336—133 |
| 2,460,921 | 2/1949 | Candy | 336—133 |
| 2,736,869 | 2/1956 | Rex | 336—133 |

LEWIS H. MYERS, *Primary Examiner.*

T. J. KOZMA, *Assistant Examiner.*